US006212562B1

(12) United States Patent
Huang

(10) Patent No.: US 6,212,562 B1
(45) Date of Patent: Apr. 3, 2001

(54) CRITICALITY AND QUALITY OF SERVICE (QOS) BASED RESOURCE MANAGEMENT

(75) Inventor: Jiandong Huang, Plymouth, MN (US)

(73) Assignee: Honeywell International Inc., Minneapolis, MN (US)

( * ) Notice: Subject to any disclaimer, the term of this patent is extended or adjusted under 35 U.S.C. 154(b) by 0 days.

(21) Appl. No.: 08/828,314

(22) Filed: Mar. 28, 1997

(51) Int. Cl.[7] ............................ G06F 15/16; G06F 15/17
(52) U.S. Cl. ...................... 709/227; 709/228; 370/468
(58) Field of Search .................................. 370/230, 395, 370/468; 709/228, 222, 226, 227

(56) References Cited

U.S. PATENT DOCUMENTS

| | | | | |
|---|---|---|---|---|
| 5,689,508 | * | 11/1997 | Lyles | 370/391 |
| 5,898,668 | * | 4/1999 | Shaffer | 370/230 |
| 5,917,822 | * | 6/1999 | Lyles et al. | 370/395 |

OTHER PUBLICATIONS

Huang et al., "Integrated System Support for Continuous Multimedia Applications," *Proceedings of the International Conference on Distributed Multimedia Systems and Applications*, Hawaii, (Aug. 1994).

Huang et al., "Resource Management for Continuous Multimedia Database Applications," *Proceedings of the 15th IEEE Real–Time Systems Symposium*, Puerto Rico, (Dec. 1994).

Huang, et al., "Presto—A Multimedia Data Management System for Mission–Critical Applications," *Final Technical Report RL–TR–96–XXXX*, Air Force Rome Laboratory, 525 Brooks Road, Griffiss AFB, NY 13441, (Dec. 1995) Draft.

Huang, et al., "Presto—A Multimedia Data Management System for Mission–Critical Applications," *Final Technical Report RL–TR–96–0183*, Air Force Rome Laboratory, 525 Brooks Road, Griffiss AFB, NY 13441, (Aug. 1996).

Huang, et al., "A Decentralized End–to–End Scheduling Approach for Continuous Multimedia Applications," *Proceedings of the 6th International Workshop on Network and Operating System Support for Digital Audio and Video*, Japan (Apr.).

Huang, et al., "Presto—A System Environment for Mission–Critical Multimedia Applications," *Proceeding of the Sixth Annual IEEE Dual–Use Technologies and Applications Conference*, (Jun. 1996).

Huang, "System Resource Management for Mission–Critical Multimedia Applications," Computer Science Colloquia, University of Minnesota, pp. 1–35, (Oct. 28, 1996).

(List continued on next page.)

Primary Examiner—Mark H. Rinehart
Assistant Examiner—Marc D. Thompson
(74) Attorney, Agent, or Firm—Marshall, O'Toole, Gerstein, Murray & Borun

(57) ABSTRACT

A resource executes a plurality of executing sessions, the resource receives an arriving session, and the resource has a resource capacity constraint. Each of the executing sessions has a QoS, a timing requirement, and a criticality level, and the arriving session has a QoS, a timing requirement, and a criticality level. The arriving session is admitted if there is sufficient resource capacity. If the resource capacity is not sufficient, a resource manager shrinks the QoS of each executing session and the QoS of the arriving session. The resource manager then (i) admits the arriving session without preemption if the resource capacity constraint can be met without preemption, (ii) admits the arriving session with criticality-based preemption if the resource capacity constraint can be met only with preemption, and (iii) denies admission of the arriving session if the resource capacity constraint cannot be met even with criticality-based preemption. The resource manager expands the QoS's of appropriate sessions following (i), (ii), or (iii), as the case may be.

56 Claims, 7 Drawing Sheets

OTHER PUBLICATIONS

Huang, "Tutorial: Real–Time Scheduling Technology for Continuous Multimedia Applications," *Lecture Notes of the 3rd ACM Multimedia Conference,* San Francisco, (Nov. 1995).

Huang, et al., "On Supporting Mission–Critical Multimedia Applications," *Proceedings of the Third IEEE International Conference on Multimedia Computing and Systems,* Japan, (Jun. 1996).

Cota–Robles, et al., "Schedulability Analysis for Desktop Multimedia Applications: Simple Ways to Handle General–Purpose Operating Systems and Open Environments," pp. 475–483, IEEE (1997).

Demers, "Analysis and Simulation of a Fair Queueing Algorithm", ACM SIGCOMM 89, Sep. 19, 1989.*

Anthony Hung et al., "Bandwidth Scheduling for Wide–Area ATM Networks Using Virtual Finishing Times", IEEE/ACM Transactions on Networking, Feb. 1996.*

Geoffrey Xie et al., "Delay Guarantee of a Virtual Clock Server", IEEE/ACM Transactions on Networking, Dec. 1995.*

Jing–Fei Ren et al., "A Dynamic Priority Queuing Approach to traffic Regulation and Scheduling in B–ISDN", Global Telecommunications Conference, 1994.*

S. Golestani, "A Self–Clocked Fair Queuing Scheme for Broadband Applications", IEEE INFOCOM, 1994.*

* cited by examiner

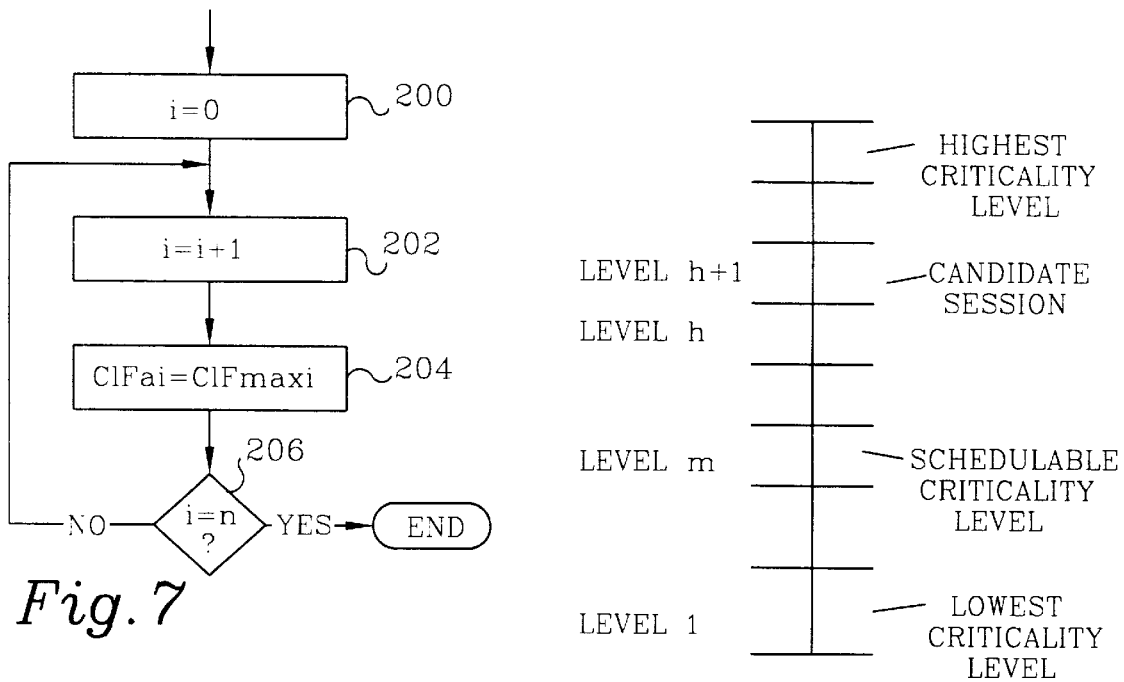
Fig. 7
Fig. 8
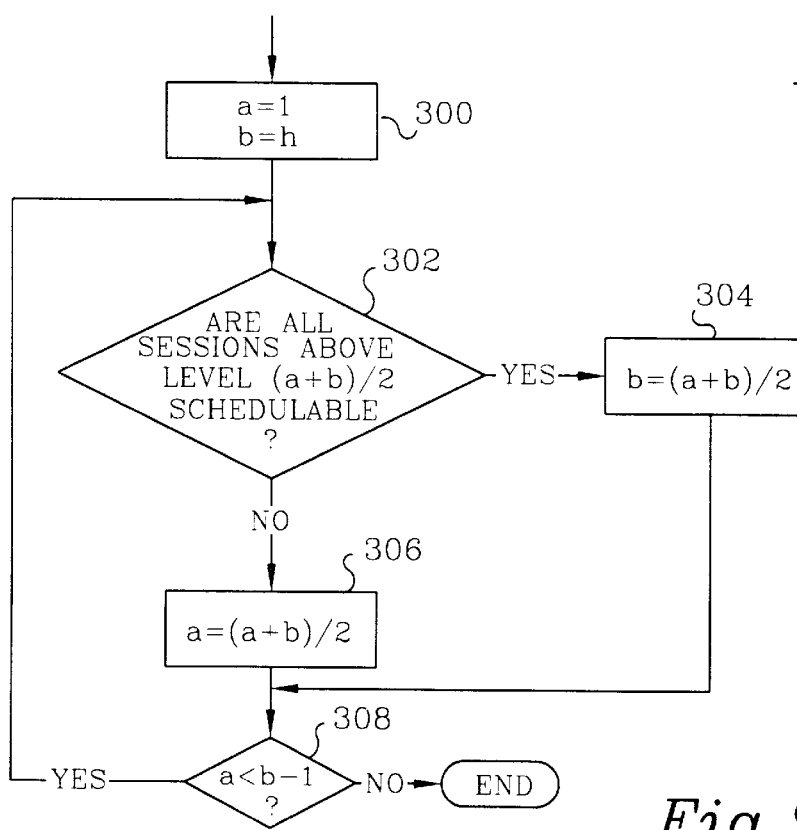
Fig. 9

CRITICALITY AND QUALITY OF SERVICE (QOS) BASED RESOURCE MANAGEMENT

This invention was made with Government support under Contract F30602-93-C-0172 awarded by the Air Force. The Government has certain rights in this invention.

RELATED APPLICATIONS

The present invention is related to the invention disclosed in U.S. patent application Ser. No. 08/827,536, filed Mar. 28, 1997 (H16-16415).

TECHNICAL FIELD OF THE INVENTION

The present invention is directed to local resource management of local data processing resources, which may include, for example, a CPU, memory, disk I/O, a video CODEC unit, a display unit, and/or the like.

BACKGROUND OF THE INVENTION

Continuous multimedia applications are being developed for entertainment (e.g., video-on-demand services), for office automation (e.g., video conferencing), for crisis management, for command and control, and the like. In these continuous multimedia applications, video, audio, and/or image streams are processed within a node and between nodes of a data processing system.

Some continuous multimedia applications are mission critical and some are not. For example, the continuous multimedia applications being developed for entertainment (e.g., video-on-demand services), for office automation (e.g., video conferencing), and the like, are not particularly mission-critical. By contrast, the continuous multimedia applications being developed for crisis management, for command and control, and the like, are often mission critical. Mission-critical continuous multimedia applications are becoming increasingly important.

Mission-critical continuous multimedia applications have at least three unique characteristics—they are criticality driven, they are dynamic, and they operate in real time. With respect to the first of these unique characteristics, media streams in mission-critical continuous multimedia applications may be associated with an attribute of criticality. Criticality is an indication of the importance of a particular application being executed at a given time, and is assigned to the application by an system administrator (or mediator) who reviews all applications to determine the criticality differences between them. For instance, an application which is performing periodic image-capturing and flaw detection in a process control can be more important than an application that monitors floor activities in a controlled plant. Consequently, the periodic image-capturing and flaw detection stream is assigned a higher criticality level by the system administrator than is the video stream relating to the monitored floor activities. In order to support different criticality levels, the data processing system which processes such media streams must be criticality cognitive and must be able to support plural critical multimedia data streams in the presence of multiple service requests.

With respect to the second of these unique characteristics, mission-critical continuous multimedia applications are often dynamic and may vary greatly in their demands on the local resources of the data processing system. In digital battlefield management, for example, detection of a mobile target may trigger a sequence of reactions, such as video monitoring, infrared tracking, image library retrieval for target matching and recognition, media data fusion and filtering, and command and control. Such dynamic demands on the local resources of the data processing system are not predictable a priori, and, therefore, require applications to negotiate on line for, and adapt to, the available local resources, which may include disk i/o bandwidth, CPU cycles, memory space, video compression/decompression capacity, and the like. Without sufficient resources and proper resource management, multimedia streams may lose their data or timeliness in a random fashion, causing application malfunction.

With respect to the third of these unique characteristics, mission-critical continuous multimedia applications must operate according to a guaranteed latency and data flow rate. Latency is the end-to-end delay from the time when the very first media unit is produced at a stream source to the time it reaches a stream destination. Rate is the number of media data units per second that are processed by a processing node.

The present invention is directed to a local resource management arrangement that manages a node's local resources which are required to execute one or more applications. In more detailed aspects of the present invention, a local resource management arrangement manages a node's local resources that are required to execute, in real time, criticality driven and dynamic applications.

SUMMARY OF THE INVENTION

According to one aspect of the present invention, a resource manager for managing a resource comprises QoS shrinking means, preempting means, and QoS expanding means. The resource executes executing sessions, and the resource receives an arriving session. The executing sessions have corresponding QoS's, and the arriving session has a QoS. The QoS shrinking means shrinks the QoS's of the executing sessions and the QoS of the arriving session. The preempting means preempts, as necessary, the executing sessions in order to execute the arriving session. The QoS expanding means expands the QoS's of the executing sessions remaining after preemption.

According to another aspect of the present invention, a method is provided to manage a resource. The resource executes executing sessions, the resource has a resource capacity constraint, and the resource receives an arriving session. Each of the executing sessions has a QoS and a criticality level, and the arriving session has a QoS and a criticality level. The method comprises the following steps: a) shrinking the QoS of the executing sessions and of the QoS's of the arriving session; b1) admitting the arriving session without preemption if the executing sessions and the arriving session do not exceed the resource capacity constraint of the resource; b2) if the arriving session and the executing sessions having criticality levels higher than the criticality level of the arriving session do not exceed the resource capacity constraint of the resource, but the arriving session and all executing sessions exceed the resource capacity constraint of the resource, preempting, as necessary, the executing sessions which have criticality levels that are lower than the criticality level of the arriving session; b3) denying admission of the arriving session if the arriving session and all of the executing sessions having criticality levels higher than the criticality level of the arriving session exceed the resource capacity constraint of the resource; and c) expanding the QoS of sessions remaining following steps b1), b2), and b3).

According to yet another aspect of the present invention, a system comprises a plurality of resources, an operating system, a plurality of resource schedulers, and a resource manager. The operating system is arranged to operate the resources. Each resource scheduler schedules access to a corresponding resource. The resource manager receives resource capacity constraints from the resource schedulers, the resource manager manages the resources in order to execute sessions within the resource capacity constraints, and the resource manager sits on top of the operating system.

According to still another aspect of the present invention, a resource manager manages a session according to a criticality level, a timing requirement, and a QoS of the session.

According to a further aspect of the present invention, a method of initiating on-line QoS negotiation and adaptation by a user comprises the following steps: a) specifying a criticality level for a session; b) specifying a timing requirement for the session; c) specifying a QoS for the session; and d) after partial execution of the session, re-specifying at least one of the criticality level, the timing requirement, and the QoS for the session

BRIEF DESCRIPTION OF THE DRAWINGS

These and other features and advantages of the present invention will become more apparent from a detailed consideration of the invention when taken in conjunction with the drawings in which:

FIG. 7 is a flow chart representing the SHRINK QoS block of FIG. 6;

FIG. 8 is a diagram useful in explaining preemption;

FIG. 9 is a flow chart representing a portion of the PREEMPT block of FIG. 6;

DETAILED DESCRIPTION

Figure 1:
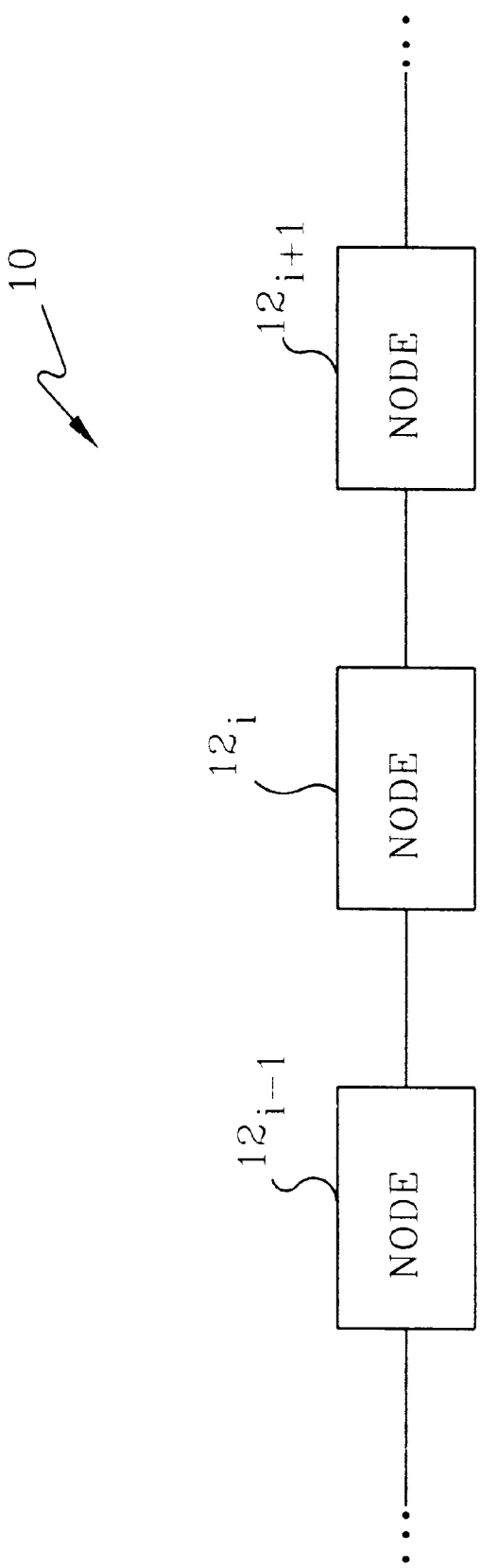
FIG. 1 is a block diagram of a distributed data processing system having a plurality of processing nodes according to the present invention.

A distributed data processing system 10, which provides an exemplary environment for the present invention, is illustrated in FIG. 1. The distributed data processing system 10 includes a plurality of processing nodes . . . , $12_{i-1}$, $12_i$, $12_{i+1}$, . . . . Each processing node of the distributed data processing system 10 manages its own local resources so that processing of applications may be distributed, as needed. For purposes of describing the present invention, it may be assumed that all processing nodes have a similar resource manager architecture so that only one processing node, such as the processing node $12_i$, is illustrated in detail in FIG. 2.

Figure 2:
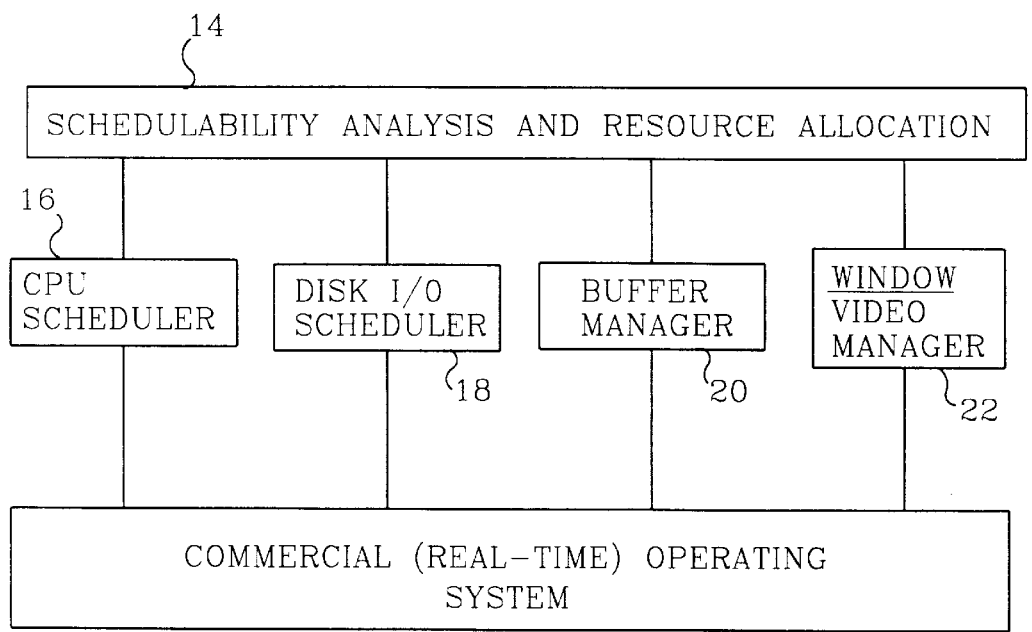
FIG. 2 is a block diagram of a typical processing node, such as a processing node $12_i$, of the distributed data processing system illustrated in FIG. 1.

The processing node $12_i$, as shown in FIG. 2, includes a node-wide resource manager 14, which accepts certain inputs, that are described below, from, and which interacts with, a CPU scheduler 16, a disk I/O scheduler 18, a buffer manager 20, and a window/video manager 22. The CPU scheduler 16, the disk I/O scheduler 18, the buffer manager 20, and the window/video manager 22 may be provided by, or operate on top of, such operating systems as Lynx™, Solaris™, or Windows NT™ in order to schedule access, respectively, to a CPU resource, a disk I/O resource, a buffer memory resource, and a window/video processing resource. These resources are managed by the node-wide resource manager 14.

The operating system 24 functions to provide system primitive services, such as setting the priority of threads and preempting and executing threads. For example, these services may be provided through the POSIX™ standard operating system interface. The node-wide resource manager 14 as described herein sits on top of the operating system 24. Also, the CPU scheduler 16, the disk I/O scheduler 18, the buffer manager 20, and the window/video manager 22 may sit on top of the operating system 24, or the CPU scheduler 16, the disk I/O scheduler 18, the buffer manager 20, and the window/video manager 22 may reside within the operating system 24. Accordingly, the node-wide resource manager 14 of the present invention does not require redesign of the operating system 24. Similarly, the node-wide resource manager 14 of the present invention does not require redesign of the CPU scheduler 16, the disk I/O scheduler 18, the buffer manager 20, and the window/video manager 22, but merely accepts certain inputs from the CPU scheduler 16, the disk I/O scheduler 18, the buffer manager 20, and the window/video manager 22.

A mission-critical multimedia application to be processed by the processing node $12_i$ can be characterized by three factors—timing, quality of service (QoS), and criticality. Timing may be characterized by rate ($\lambda$) and latency (L). As described above, rate ($\lambda$) is defined as the number of media data units per second that are processed by the processing node $12_i$. For example, if the processing node $12_i$ processes video data, a media data unit may be a video frame, and the rate ($\lambda$) may be specified at thirty frames per second, which is standard for the transmission of conventional television signals in the United States. Latency (L) is the tolerable end-to-end delay from the time when the very first media unit is produced at a stream source to the time it reaches a stream destination. Rate ($\lambda$) and latency (L) are specified by the application user. An application user is a user of the distributed data processing system 10 who desires execution of an application.

QoS specifies the degree of service quality expected for the application from the underlying computer system. QoS may be defined in terms of a consecutive loss factor (CLF). QoS and CLF are inversely related so that, as the consecutive loss factor CLF goes up, the quality of service QoS goes down, and so that, as the consecutive loss factor CLF goes down, the quality of service QoS goes up. CLF is the number of consecutive data units which may be dropped between every two processing units.

Figure 3:
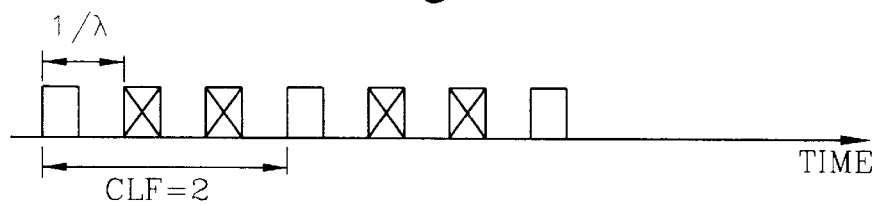
FIG. 3 is a timing diagram illustrating an example of a consecutive loss factor (CLF) which defines quality of service (QoS) and which is used, along with timing and criticality, by a node-wide resource manager of the processing node illustrated in FIG. 2.

FIG. 3 illustrates an example of the consecutive loss factor (CLF). In this example, only one in three media data units (such as image frames) are being processed. Thus, two of every three data units are being dropped. Accordingly, the continuous loss factor (CLF) as shown in FIG. 3 is 2.

The application user specifies the CLF of an application that the application user desires to be executed so that the specified CLF is in the range [0, $\text{CLF}_{max}$], where $\text{CLF}_{max}$ is the maximum number of consecutive data units which may be dropped between every two processing units. At run time, the application being processed by the processing node $12_i$ may adapt its CLF between 0 and $\text{CLF}_{max}$, depending on the availability of system resources. The application user, also, may re-specify, on line, the CLF within the range [0, $\text{CLF}_{max}$], depending on availability of system resources.

Alternatively, QoS may be defined in terms other than consecutive loss factor (CLF). For example, QoS may be defined in terms of a JPEG Quantization Factor (QFactor).

Criticality refers to the degree of application importance among concurrent applications. Importance may be throughput importance, economic importance, security importance, or the like. When not all applications can be processed by the processing node $12_i$, applications having lower criticality levels are preempted in favor of applications having higher criticality levels. A criticality level is determined and assigned by a system administrator, who administrates the applications submitted to the processing node $12_i$ for processing, and not by the application user who wishes to launch an application. If a criticality level were assigned by an application user launching an application, most applications would be given the highest possible criticality level by the application user so that preemption would not be meaningful. After the criticality level is determined and assigned by the system administrator, the application user inputs the assigned criticality level.

Figure 4:
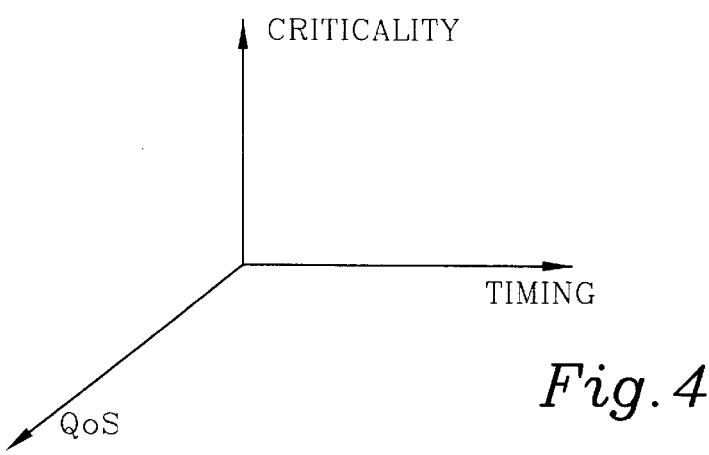
FIG. 4 is a coordinate system illustrating the orthogonality of timing, criticality, and QoS.

FIG. 4 illustrates that timing, criticality, and QoS are orthogonal to each other, i.e., the application user and the system administrator may specify any of these independently of the others. For example, a high rate application may have low criticality and/or a low QoS requirement, and so on. System resources should be allocated and scheduled so that the applications' timing constraints are met, so that the QoS's of the applications are maximized, and so that the number of high criticality applications being processed is maximized.

Figure 5:
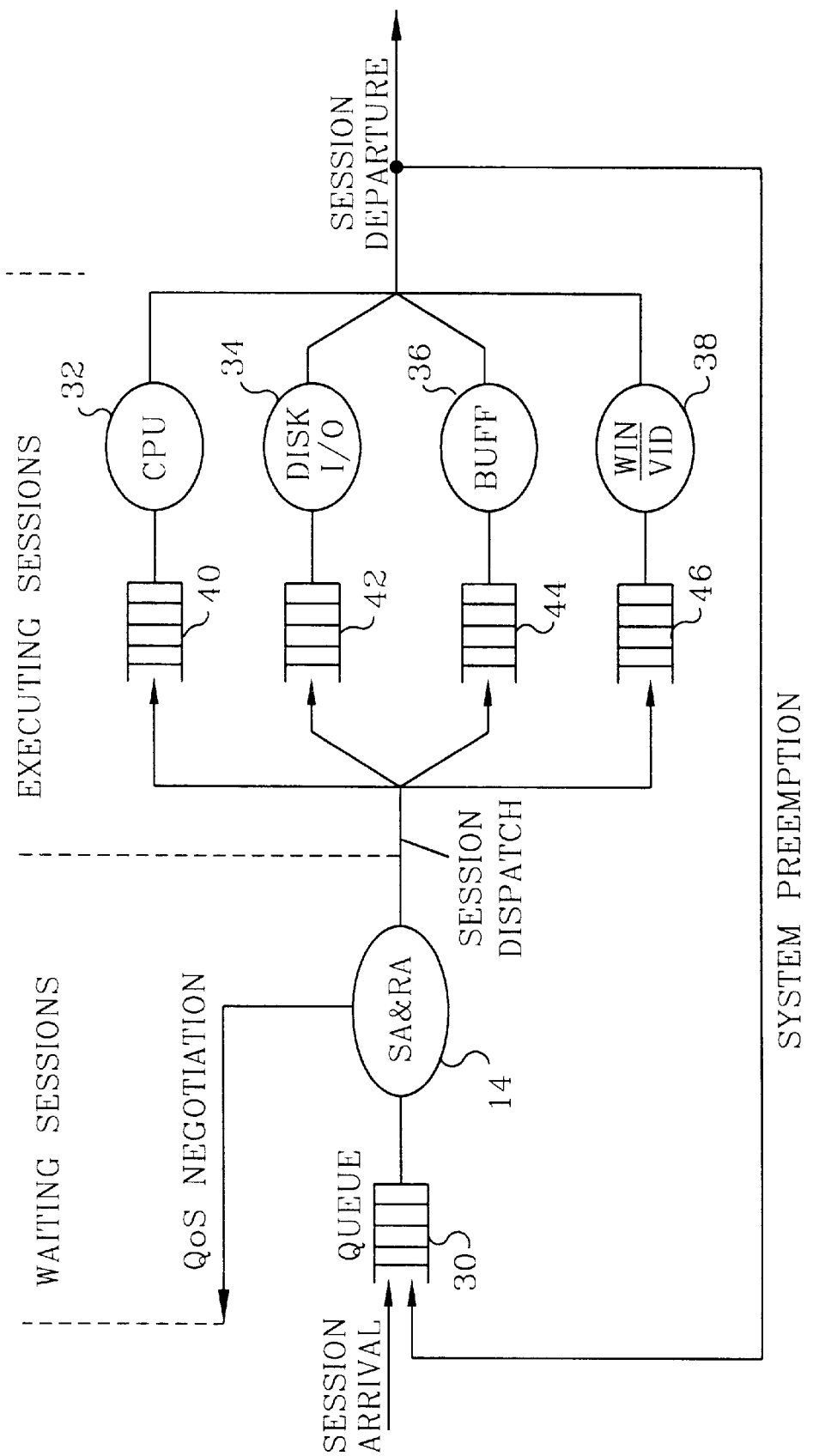
FIG. 5 is a resource management mechanism illustrating the flow of sessions into and out of, and the execution of sessions within, the local data processing resources of the processing node illustrated in FIG. 2.

A resource manager mechanism for concurrent sessions processed by the node-wide resource manager 14 is illustrated in FIG. 5. Concurrent sessions are all of the sessions in the processing node $12_i$, whether they are in a state of execution or not. At any point in time, arriving sessions and/or preempted (blocked) sessions may be maintained in a criticality-ordered waiting queue 30. A session is an internal system activity defined by an execution behavior of a continuous multimedia application. As is known, a session consists of a set of system entities (e.g., producer threads, consumer threads, buffers) that form an execution path of the multimedia data flow between a producer process and a consumer process. Accordingly, a session may demand a certain amount of disk I/O bandwidth for storage access, memory space for buffering, CPU cycles for media data processing, and/or video processing bandwidth.

When a behavior which defines a session changes, a new session begins. For example, video which is transmitted at 30 frames per second may define one session behavior. When the transmission rate of the video is changed to 20 frames per second by an application user, a new session is started, and the old session ends. Accordingly, any one continuous multimedia application may include several sessions during its execution.

Sessions in the criticality-ordered waiting queue 30 are not being currently processed by the local resources of the processing node $12_i$. These local resources include a CPU resource 32, a disk I/O resource 34, a buffer resource 36, and a window/video processing resource 38. The CPU resource 32 is scheduled by the CPU scheduler 16, the disk I/O resource 34 is scheduled by the disk I/O scheduler 18, the buffer resource 36 is scheduled by the buffer manager 20, and the window/video processing resource 38 is scheduled by the window/video manager 22.

If the CPU resource 32, the disk I/O resource 34, the buffer resource 36, and/or the window/video processing resource 38 have excess capacity in order to execute an additional session, the node-wide resource manager 14 dispatches a session from the criticality-ordered waiting queue 30 to a CPU resource queue 40 corresponding to the CPU resource 32, to a disk I/O queue 42 corresponding to the disk I/O resource 34, to a buffer queue 44 corresponding to the buffer resource 36, and to a window/video queue 46 corresponding to the window/video processing resource 38, as appropriate. The sessions in the CPU resource queue 40, the disk I/O queue 42, the buffer queue 44, and the window/video queue 46 are to be executed by the CPU resource 32, the disk I/O resource 34, the buffer resource 36, and the window/video processing resource 38.

If the CPU resource 32, the disk I/O resource 34, the buffer resource 36, and/or the window/video processing resource 38 do not have excess capacity in order to execute an additional session, the node-wide resource manager 14 conducts an automatic QoS negotiation within the QoS range [0, $\text{CLF}_{max}$] of the executing sessions. During this QoS negotiation, the QoS's of all executing sessions and of an additional session are shrunk. If this QoS shrinking frees up sufficient capacity of the CPU resource 32, the disk I/O resource 34, the buffer resource 36, and/or the window/video processing resource 38 to permit execution of the additional session, the additional session is admitted for execution. However, if there is still insufficient capacity after QoS shrinking, and if the additional session has a higher criticality level than one or more of the executing sessions (i.e., sessions being executed by the CPU resource 32, the disk I/O resource 34, the buffer resource 36, and the window/video processing resource 38), enough executing sessions are preempted, if possible, until there is sufficient free capacity of the CPU resource 32, the disk I/O resource 34, the buffer resource 36, and/or the window/video processing resource 38 to permit execution of the additional session. The additional session is then admitted for execution. (Session preemption differs from thread (or process) preemption in traditional operating systems in that session preemption involves preemption of an executing session from multiple resources, whereas thread preemption involves preemption of a thread from a single resource.) On the other hand, if the additional session cannot be admitted even with preemption, then no executing sessions are preempted and the additional session is not admitted for execution.

When a session departs from the CPU resource queue 40, the disk I/O queue 42, the buffer queue 44, and/or the window/video queue 46 because of preemption, the preempted session is removed from the CPU resource queue 40, the disk I/O queue 42, the buffer queue 44, and the window/video queue 46, and is added to the criticality-ordered waiting queue 30. When a session departs from the CPU resource queue 40, the disk I/O queue 42, the buffer queue 44, and/or the window/video queue 46 because the session has been completely executed, the executed session is simply removed from the CPU resource queue 40, the disk I/O queue 42, the buffer queue 44, and the window/video queue 46.

The CPU scheduler 16, the disk I/O scheduler 18, the buffer manager 20, and the window/video manager 22 provide the following corresponding inputs: $C_{max}$, $D_{max}$, $M_{max}$, and $V_{max}$. These inputs describe the capacities of the resources that the corresponding schedulers/managers manage, and are used by the node-wide resource manager 14 in order to establish the criteria which the node-wide resource manager 14 uses to determine whether an arriving session is schedulable. Specifically, for the disk I/O scheduler 18, commercial disk subsystems usually provide I/O scheduling support, often with a SCAN algorithm, at the SCSI controller level. Thus, in order to reduce disk head movement overhead and guarantee a bounded access time, the node-wide resource manager 14 employs a simple interval-based I/O access policy. Accordingly, let $$L = \text{Min}(L_i), \text{ where } 1 \leq i \leq n \quad (1)$$

and where L is the latency tolerable by all of the executing sessions n relating to all of the applications being executed by the processing node $12_i$ at a given time. Accordingly, L is the time interval for scheduling of concurrent media streams. If it is assumed that the amount of contiguous data that the disk I/O resource 34 can transfer in one second is $D_{max}$, and that the average disk seek time for serving each I/O request within L is S, then, during the time interval L, the effective transfer time is L−nS. Therefore, the n sessions can be schedulable only if $$\sum_{i=1}^{n} x_i u_i \leq (L - nS) D_{max} \quad (2)$$

where $x_i = \lceil r_i L \rceil$, where $u_i$ is the size of one data unit, and where the quantity $D_{max}$ and the average disk seek time S are constraints of the disk I/O resource 34. The quantity $r_i$ for session i may be determined from the following equation:

$$r_i = \frac{\lambda_i}{1 + CLFa_i} \quad (3)$$

where $\lambda_i$ and $CLF_{ai}$ are specified by the application user for an application corresponding to session i, and where $CLFa_i \in [0, CLFmax_i]$. The equation (2) may be rewritten according to the following equation:

$$\sum_{i=1}^{n} x_i u_i + nSD_{max} \leq LD_{max}. \quad (4)$$

For the CPU scheduler 16, all threads are periodic in nature. Furthermore, thread access to media data buffers is non-blocking when a double-buffering technique is employed. Thus, a standard rate monotonic analysis (RMA) approach for CPU scheduling may be adopted. That is, a number of sessions n are schedulable for the CPU resource 32 if the following equation is satisfied:

$$\sum_{i=1}^{n} (e_i r_i + e'_i / L) \leq \ln 2 \equiv C_{max} \quad (5)$$

where $e_i$ is the execution time of the CPU for processing one unit of media data and $e'_i$ is the execution time of the CPU for a disk I/O operation. $C_{max}$ is the maximum cycle rate of the CPU.

With respect to the window/video manager 22, the n sessions being executed may deliver video frames at the aggregate rate defined by the following expression:

$$\sum_{i=1}^{n} r_i. \quad (6)$$

If $V_{max}$ is the maximum video rate supportable by the window/video processing software of the window/video processing resource 38, then n sessions may be schedulable if the following expression is satisfied:

$$\sum_{i=1}^{n} r_i \leq V_{max}. \quad (7)$$

The buffer manager 20 allocates and de-allocates memory using the underlying operating system services provided by the operating system 24. The n concurrent sessions consume bytes of memory defined by the following expression:

$$2 \sum_{i=1}^{n} x_i u_i. \quad (8)$$

If the maximum memory space available is $M_{max}$ bytes, then n concurrent sessions can be supported if the following equation is satisfied:

$$2 \sum_{i=1}^{n} x_i u_i \leq M_{max}. \quad (9)$$

Accordingly, the n concurrent sessions are schedulable by the processing node $12_i$ if the resource capacity constraints established by the equations (4), (5), (7), and (9) are met. Resource capacity constraints similar to the equations (4), (5), (7), and (9) may be developed for any other resources of the processing node $12_i$.

However, it should be noted that the present invention may be used in connection with different types of CPU schedulers, disk I/O schedulers, buffer managers, and window/video managers. For example, as discussed above, the CPU scheduler 16 may employ Rate Monotic Analysis (RMA) scheduling. In this case, the schedulability bound is $C_{max} = \ln 2 = 0.69$. However, the CPU scheduler 16 may instead use Earliest Deadline First (EDF) scheduling. In this case, the schedulability bound is $C_{max} = 1.0$. Thus, the node-wide resource manager 14 can interface with any type of CPU scheduler as long as it receives the particular $C_{max}$ from the selected CPU scheduler 16.

Figure 6:
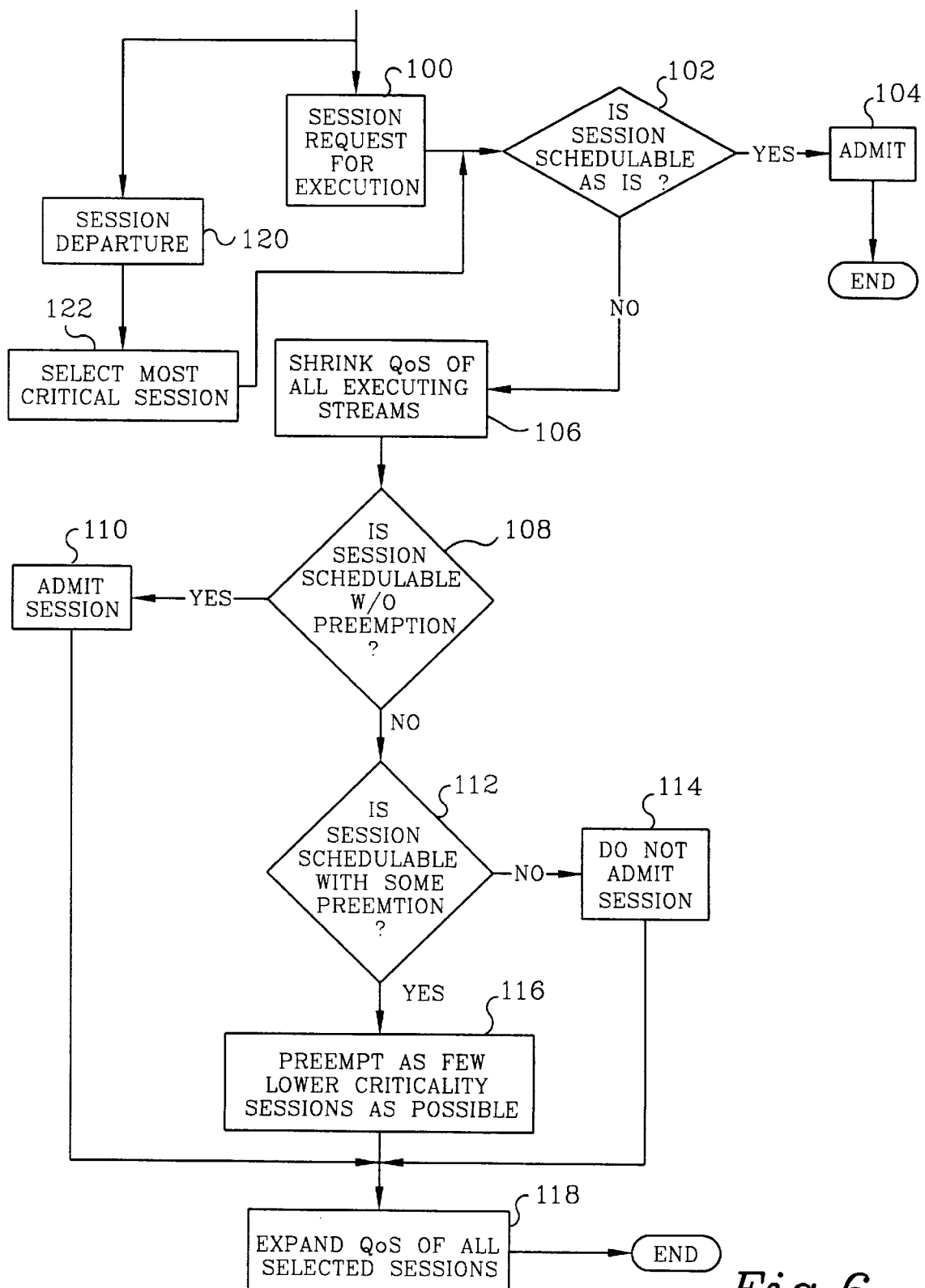
FIG. 6 is a flow chart representing the management of local resources by the node-wide resource manager for the local processing of applications by the processing node illustrated in FIG. 2.

The node-wide resource manager 14 operates according to the flow chart illustrated in FIG. 6. When a new session requests execution or otherwise arrives at the criticality-ordered waiting queue 30 (block 100), the node-wide resource manager 14 initializes the actual $CLFa_i$ for the arriving session to the CLF set by the application user, and generates the resource requirements established by the equations (4), (5), (7), and (9). The node-wide resource manager 14 at a block 102 determines whether this session can be scheduled for execution without QoS shrinking. The node-wide resource manager 14 makes this determination by using the resource capacity constraints established by the equations (4), (5), (7), and (9). If the node-wide resource manager 14 at the block 102 determines that the arriving session can be scheduled for execution without QoS shrinking, the arriving session is admitted at a block 104. Thus, the arriving session can be executed.

On the other hand, if the node-wide resource manager 14 at the block 102 determines that the arriving session cannot be scheduled for execution without QoS shrinking, a block 106 shrinks the QoS's of the arriving session and of all executing sessions, where the executing sessions are the sessions currently being executed by the CPU resource 32, the disk I/O resource 34, the buffer resource 36, and the window/video processing resource 38.

The QoS's of the arriving session and of the executing sessions are shrunk by increasing the actual CLF's (CLFa) of the arriving session and executing sessions to their corresponding CLFmax's, which were specified by the application user. Generally, the QoS's of all of the executing sessions are shrunk. Alternatively, the QoS's of less than all of the executing sessions may be shrunk. When shrinking the QoS's of the arriving session and of the executing sessions, the node-wide resource manager 14, as illustrated in FIG. 7, sets a variable i equal to zero at a block 200 and increments the variable i by one at a block 202. At a block 204, the node-wide resource manager 14 then sets the actual CLF for session i (CLFa$_i$) equal to the CLFmax for session i (CLFmax$_i$) as determined by the maximum CLF specified by the application user for the application corresponding to session i. At a block 206, the node-wide resource manager 14 determines whether the arriving session and all executing sessions n have been processed. If not, the node-wide resource manager 14 increments i by one and adjusts the CLF of the next corresponding session. When the node-wide resource manager 14 determines that the QoS's of the arriving session and of all executing sessions (sessions n) have been shrunk, the node-wide resource manager 14 terminates this adjustment of the CLF's of the arriving session and the executing sessions. If QoS is defined in terms other than consecutive loss factor (CLF), FIG. 7 may require appropriate modification.

The order of shrinking may be determined by the system administrator as a matter of policy. For example, in order to discourage long running applications, the QoS's of executing sessions may be shrunk in order of running time, with the QoS of the longest running executing session being shrunk first. Alternatively, the QoS's of executing sessions may be shrunk in a random order. As a further alternative, in order to provide better QoS's for high criticality sessions, the QoS's of executing sessions may be shrunk in order of criticality, with the QoS of the executing session having the lowest criticality being shrunk first. Other alternatives are possible.

Once the QoS's of the arriving session and the executing sessions are shrunk, the node-wide resource manager 14 determines at a block 108 whether the arriving session is schedulable without preempting any of the executing sessions. The node-wide resource manager 14 makes this determination by using the resource capacity constraints established by the equations (4), (5), (7), and (9). In other words, the node-wide resource manager 14 determines the new rate r$_i$ for each of these executing sessions based on the equation (3), where CLFa$_i$ has been increased to the maximum value (i.e., the minimum QoS) for that executing session according to the block 106. Accordingly, the equations (4), (5), (7), and (9) are recalculated based upon the new r$_i$. Then, the node-wide resource manager 14 determines whether the resource requirements for the arriving session, and for all of the executing sessions, exceed the maximum capacities LD$_{max}$, C$_{max}$, V$_{max}$, and M$_{max}$ of the CPU resource 32, the disk I/O resource 34, the buffer resource 36, and/or the window/video processing resource 38, respectively. If these maximum capacities are not exceeded, the arriving session is admitted at a block 110.

If the arriving session is not schedulable without preemption as determined at the block 108, the node-wide resource manager 14 determines at a block 112 whether the arriving session is schedulable with some preemption. In this case, the node-wide resource manager 14 determines whether any executing sessions having lower criticality levels than the arriving session can be preempted in order to accommodate the arriving session with respect to the CPU resource 32, the disk I/O resource 34, the buffer resource 36, and/or the window/video processing resource 38 of the processing node 12$_i$. In making this determination, the node-wide resource manager 14 again uses the resource capacity constraints established by the equations (4), (5), (7), and (9) in order to determine whether the resource requirements of the arriving session, and of all executing sessions having criticality levels higher than the criticality level of the arriving session, exceed the maximum capacities LD$_{max}$, C$_{max}$, V$_{max}$, and M$_{max}$. If the resource requirements of the arriving session, and of all executing sessions having criticality levels higher than the criticality level of the arriving session, exceed the maximum capacities LD$_{max}$, C$_{max}$, V$_{max}$, and M$_{max}$, the arriving session cannot be admitted. Accordingly, the node-wide resource manager 14 at a block 114 does not admit the arriving session.

However, if the arriving session is not schedulable without preemption as determined at the block 108, but if the arriving session is schedulable with some preemption as determined at the block 112, the node-wide resource manager 14 performs preemption at a block 116. The arriving session, referred to as a candidate session in FIG. 8, may have a criticality level somewhere between the highest criticality level and the lowest criticality level of the executing sessions being executed by the CPU resource 32, the disk I/O resource 34, the buffer resource 36, and/or the window/video processing resource 38. At each criticality level, there may be several executing sessions. These executing sessions at the same criticality level have the same criticality level assigned by the system administrator for the applications corresponding to these sessions.

When conducting preemption, the node-wide resource manager 14 executes a search in order to find a schedulable criticality level. For example, the node-wide resource manager 14 may execute a binary search such as that shown in FIG. 9 in order to find the schedulable criticality level. The schedulable criticality level is designated as level m in FIG. 8. The schedulable criticality level is the criticality level at which preemption begins. Thus, each executing session having a criticality level above the schedulable criticality level is not preempted, and the executing sessions at or below the schedulable criticality level may or may not be preempted, as discussed below.

At a block 300, the node-wide resource manager 14 sets a variable a equal to one (i.e., the lowest criticality level) and sets a variable b equal to h, where h is the criticality level just below the criticality level assigned to the arriving session. At a block 302, the node-wide resource manager 14 determines whether all executing sessions, which have criticality levels above the criticality level as indicated by the average of the variables a and b, are schedulable. That is, the node-wide resource manager 14 determines whether all of these executing sessions satisfy the resource capacity constraints represented by the equations (4), (5), (7), and (9), if executed. If all of these executing sessions are determined to be schedulable, then the variable b is reduced to the middle of a and b. This operation, in effect, lowers the upper bound of the criticality level for the executing sessions being tested at the block 302.

On the other hand, if all of the executing sessions, which have criticality levels above the criticality level as designated by the average of a and b, are not schedulable, then the variable a is raised to the middle of a and b. This operation, in effect, raises the lower bound of the criticality level for the executing sessions being tested at the block 302.

After the variable b is decreased to the middle of a and b at a block 304, or after the variable a is increased to the middle of a and b at a block 306, the node-wide resource manager 14 determines at a block 308 whether the variable a is less than the variable b minus one. If so, the node-wide resource manager 14 again performs the functions indicated by the blocks 302, 304, and 306. When the variable a is no longer less than the variable b minus one, the node-wide resource manager 14 ends the binary search represented by the flow chart at FIG. 8, and determines that level a is the schedulable criticality level m indicated in FIG. 9.

Once the node-wide resource manager 14 finds the schedulable criticality level m, the node-wide resource manager 14, in effect, preempts all executing sessions at that level and at lower levels. The node-wide resource manager 14 then executes a procedure in order to determine which, if any, of the executing sessions at the schedulable criticality level may be added back (i.e., may be executed). This procedure may be implemented in a number of ways. For example, in order to discourage long running applications, sessions may be added back in order of running time, with the shortest running session being added back first. Alternatively, a randomly selected session may be added back first. As a further alternative, a linear program may be implemented. Such a linear program is represented by the following equations:

$$(IP_k) \quad \max \sum_{j=1}^{n_k} y_{kj} \quad (10)$$

$$\text{s.t.} \sum_{j=1}^{n_k} y_{kj}(e_{kj}r_{kj} + e'_{kj}/L) \leq U_{\text{rem}} \quad (11)$$

$$\sum_{j=1}^{n_k} y_{kj}x_{kj} \leq V_{\text{rem}} \quad (12)$$

$$\sum_{j=1}^{n_k} y_{kj}M_{kj} \leq M_{\text{rem}} \quad (13)$$

$$\sum_{j=1}^{n_k} y_{kj}(x_{kj}u_{kj} + SD_{\max}) \leq D_{\text{rem}} \quad (14)$$

$$y_{kj} = 0 \text{ or } 1, 1 \leq j \leq n_k \quad (15)$$

The remaining capacities of the CPU resource 32, the disk I/O resource 34, the buffer resource 36, and/or the window/video processing resource 38 are designated as $U_{rem}$, $D_{rem}$, $M_{rem}$, and $V_{rem}$ in the equations (11)–(14), and the variable k represents the current criticality level being processed by the linear program shown in the equations (10)–(15). Thus, for each executing session j at the criticality level k, the variable y is tested with respect to the equations (11)–(14). If the y at level k for executing session j satisfies the equations (11)–(14), it is accumulated according to the equation (10). When all executing sessions $n_k$ at criticality level k have been so processed, the variable y accumulated at the equation (10) determines the maximum number of the executing sessions at criticality level k that may be executed. Executing session j at criticality level k can only be added back (i.e., executed) if its corresponding y value is one, and if the equations (11)–(14) are satisfied. Thus, if the corresponding y value for each executing session at criticality level k is one, all executing sessions at criticality level k may be executed and are therefore added back. However, if not all executing sessions at criticality level k can be added back, then those executing sessions whose corresponding y values produce a maximum accumulated y according to the equation (10) are added back, and the remaining executing sessions are preempted.

The criticality level variable k is initially set to m. After all executing sessions at the schedulable criticality level m are tested to determine if they can be added back, the variable k is decremented by one, and the executing sessions at the next lower criticality level are similarly tested. It is necessary to test the executing sessions at levels m–1, m–2, . . . because a session may be preempted at the schedulable criticality level m which frees up sufficient resources to permit adding back of an executing session at a lower criticality level. For example, there may be two executing sessions $S_i$ and $S_j$ at the schedulable criticality level m, where the executing session $S_i$ requires ten CPU cycles and the executing session $S_j$ requires five CPU cycles. There may also be an executing session $S_k$ at the criticality level m–1 that requires two CPU cycles. If the arriving session requires five CPU cycles, preemption of the executing session $S_k$ will be inadequate to permit execution of the arriving session, and preemption of the executing session $S_j$ would be overkill. Therefore, the executing sessions $S_i$ and $S_k$ are added back and the executing session $S_j$ is not. This process of decrementing the variable k by one and testing the executing sessions at that criticality level continues until a level is reached at which some or none of the executing sessions can be added back. Thus, the preempted executing sessions at those levels and the executing sessions at all lower levels are preempted.

The processing of the linear program represented by the equations (10)–(15) requires substantial execution time. In order to reduce this time, a still further alternative adding back procedure, i.e., an approximation to the linear program discussed above, may be implemented. This approximation is based on the following linear programming relaxation of $(IP_k)$:

$$(LP_k) \quad \max \sum_{j=1}^{n_k} y_{kj} \quad (16)$$

$$\text{s.t.} \sum_{j=1}^{n_k} y_{kj}(e_{kj}r_{kj} + e'_{kj}/L) \leq U_{\text{rem}} \quad (17)$$

$$\sum_{j=1}^{n_k} y_{kj}x_{kj} \leq V_{\text{rem}} \quad (18)$$

-continued $$\sum_{j=1}^{n_k} y_{kj} M_{kj} \leq M_{\text{rem}} \quad (19)$$

$$\sum_{j=1}^{n_k} y_{kj}(x_{kj}u_{kj} + SD_{\max}) \leq D_{\text{rem}} \quad (20)$$

$$0 \leq y_{kj} \leq 1, 1 \leq j \leq n_k \quad (21)$$

Then, the following approximation algorithm may be implemented: (i) solve ($LP_k$) and let ($y_{kj}$, j=1, . . . , $n_k$) be an optimum solution; (ii) order $y_{kj}$ such that $y_{k1} \geq y_{k2} \geq \ldots \geq y_{kn_k}$; and, (iii) assign session priorities according to the order obtained from step (ii). After finishing the priority assignment, the adding-back process can be performed according to the order of priorities.

A yet further alternative adding back procedure, i.e., a primal-dual algorithm, may be implemented to maximize the number of executing sessions (or to minimize the number of preempted sessions). Such an algorithm begins with a dual feasible solution and a corresponding primal infeasible solution. At each step of the algorithm, an improved dual feasible solution and a correspondingly less feasible primal solution are found. The algorithm ends when the primal solution becomes feasible. Accordingly, ($LP_k$) may be expressed in an abstract form as follows:

$$(P) \max \sum_{j=1}^{n} x_j \quad (22)$$

$$s.t. \sum_{j=1}^{n} a_{ij}x_j \leq b_i, 1 \leq i \leq 4 \quad (23)$$

$$0 \leq x_j \leq 1, 1 \leq j \leq n \quad (24)$$

In dual form of the linear programming represented by the equations (22)–(24), each constraint represented by $$\sum_{j=1}^{n} a_{ij}x_j \leq b_i \quad (25)$$

may be associated with a variable $y_i (1 \leq i \leq 4)$, and each constraint $x_j \leq 1$ may be associated with a variable $z_j(1 \leq j \leq n)$. Accordingly, the dual linear program may be expressed as follows:

$$(D) \min \sum_{i=1}^{4} b_i y_i + \sum_{j=1}^{n} z_j \quad (26)$$

$$s.t. \ z_j + \sum_{j=1}^{n} a_{ij}y_i \geq 1, 1 \leq j \leq n \quad (27)$$

$$y_i \geq 0, 1 \leq i \leq 4 \quad (28)$$

$$z_j \geq 0, 1 \leq j \leq n. \quad (29)$$

According to the primal-dual theorem, for any primal feasible solution $x_j(1 \leq j \leq n)$ and any dual feasible solution $y_i(1 \leq i \leq 4), z_j(1 \leq j \leq n)$, $z_j > 0$ will imply $x_j = 1$ for any $1 \leq j \leq n$. Accordingly, the dual-primal algorithm is begun by assuming a dual feasible solution of $$y_i = 0 (1 \leq i \leq 4), z_y = 1 (1 \leq j \leq n) \quad (30)$$

and a corresponding primal solution of $$x_j = 1 (1 \leq j \leq n). \quad (31)$$

If the primal solution is a primal feasible solution, then the primal feasible solution is the solution. Otherwise, some $x_j$ is set equal to zero. The specific $x_j$ that is set equal to zero is selected as follows: (i) at each step, an attempt is made to minimize the dual objective function by maximally increasing some $y_i$ while keeping others at zero; (ii) to keep the dual solution feasible, the $z_j$'s should be correspondingly decreased and some $z_j$ will vanish because $y_i$ is maximally increased; (iii) if $y_i$ is chosen to be increased, then $y_i$ can be increased at most by an amount defined by the following equation $$\Delta y_i = \min_{1 \leq j \leq n} \frac{1}{a_{ij}} = \frac{1}{\max_{1 \leq j \leq n} a_{ij}}; \quad (32)$$

(iv) for each $1 \leq j \leq n$, $z_j$ will decrease by $a_{ij}\Delta y_i$, and $z_j$ will become zero if $a_{ij}$ achieves the following $$\max_{1 \leq j \leq n} a_{ij}; \quad (33)$$

and, (v) the dual objective function, therefore, will be reduced by $$\sum_{j=1}^{n} a_{ij}\Delta y_i - b_i \Delta y_i = \frac{\sum_{j=1}^{n} a_{ij} - b_i}{\max_{1 \leq j \leq n} a_{ij}}. \quad (34)$$

To maximize this reduction, $y_i$ may be increased such that the right-hand portion of the equation (34) achieves the following:

$$\max_{1 \leq j \leq 4} \sum_{j=1}^{n} a_{ij} - \frac{b_i}{\max_{1 \leq j \leq n} a_{ij}} \quad (35)$$

Once $y_i$ is found, $x_j$ is set to zero, where $a_{ij}$ achieves a maximum in the range $1 \leq j \leq n$ because the corresponding $z_j$ now becomes zero.

The above observations lead to the following algorithm: (i) let $S = \{1, 2, \ldots, n\}$; and (ii) while S is not the feasible solution of the primary problem, (iia) find i such that $$\frac{\sum_{j \in S} a_{ij} - b_i}{\max_{j \in S} a_{ij}} \quad (36)$$

achieves $$\max_{1 \leq i \leq 4} \sum_{j \in S} \frac{a_{ij} - b_i}{\max_{j \in S} a_{ij}}; \quad (37)$$

(iib) find j∈S such that $a_{ij}$ achieves the following $$\max_{j \in S} a_{ij};  \quad (38)$$

and, (iic) set S=S−{j}.

Other alternative adding back procedures are possible.

Figure 10:
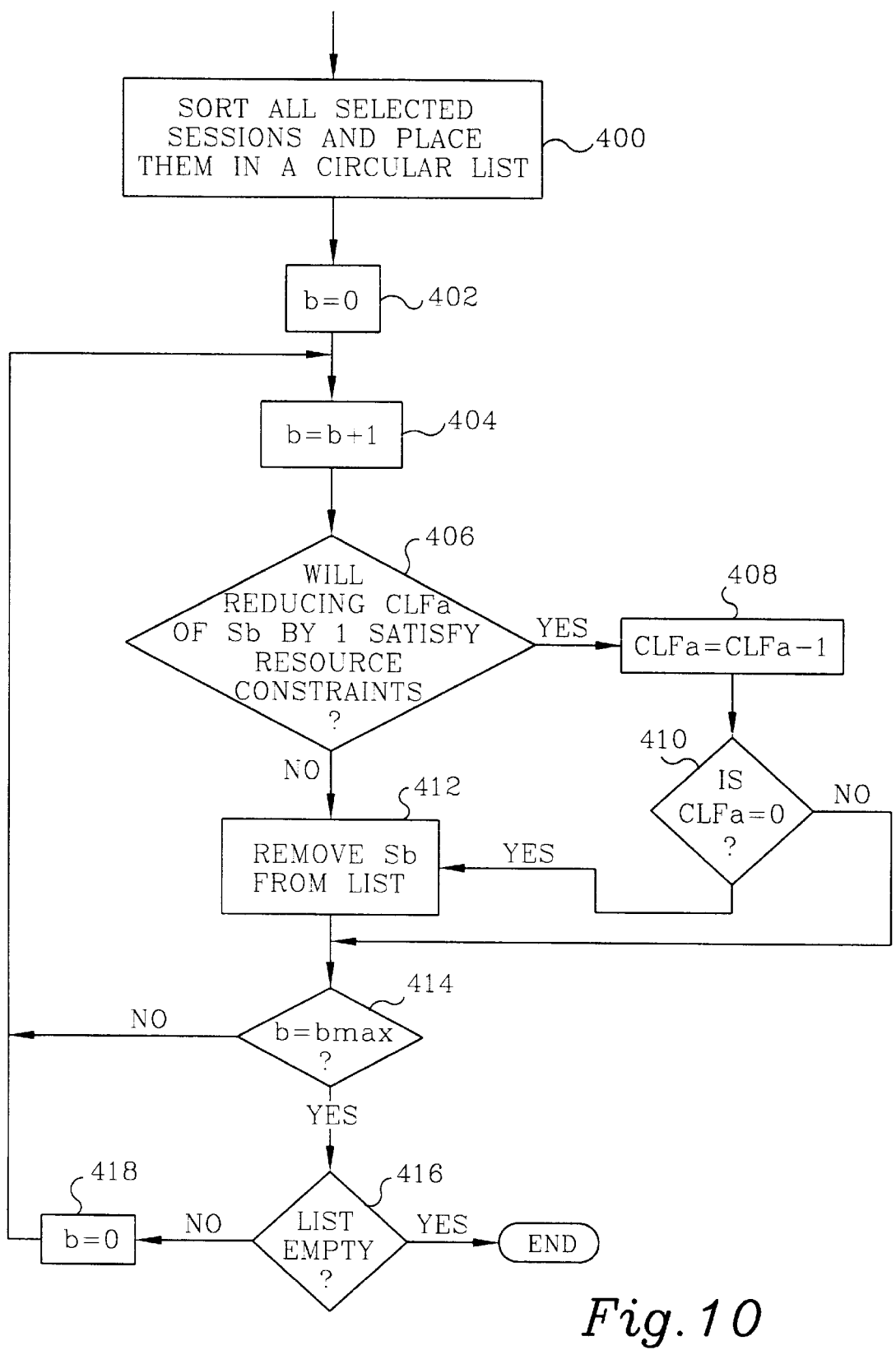
FIG. 10 is a flow chart representing the EXPAND QoS block of FIG. 6.

After the arriving session is admitted at the block 110, or after the node-wide resource manager 14 conducts preemption at the block 116 according to one of the procedures set out above or according to any other desired procedure, or after the arriving session is not admitted at the block 114, the node-wide resource manager 14 expands the QoS's of (i) all of the executing sessions plus the admitted arriving session as indicated by the block 110, or (ii) all of the executing sessions remaining after preemption as indicated by the block 116, or (iii) just the executing sessions as indicated by the block 114. If the arriving session is not admitted at the block 114, the node-wide resource manager 14 at the block 118 may simply return the QoS's of the executing sessions to the QoS's that they had before the shrinking operation at the block 106. However, if the arriving session is admitted at the block 110, or if preemption is conducted at the block 116, FIG. 10 illustrates the procedure implemented by the node-wide resource manager 14 in expanding the relevant QoS's.

In expanding these QoS's, the node-wide resource manager 14 sorts all of the relevant sessions at a block 400 and places all of these sessions in a circular list. Accordingly, the circular list may list the relevant sessions in a sorted order selected by the system administrator. For example, the sessions may be listed in order of QoS, with the session having the lowest QoS listed first. Alternatively, the sessions may be listed in order of arrival, with the session arriving first listed first. As a further alternative, the sessions may be listed in order of execution time with, the session having the shortest execution time listed first. As a still further alternative, the sessions may be listed in a random order. Other alternatives are possible.

A variable b is set to zero at a block 402, and the variable b is incremented by one at a block 404. At a block 406, the node-wide resource manager 14 determines whether the resource capacity constraints, as given by the equations (4), (5), (7), and (9), will be satisfied if the actual CLF (i.e., CLFa) for session b (i.e., Sb) is reduced by one. If so, the node-wide resource manager 14 at a block 408 reduces the actual CLF of session b by one, and then determines at a block 410 whether the actual CLF for session b is zero. If the actual CLF for session b is zero, as determined by the node-wide resource manager 14 at the block 410, the node-wide resource manager 14 removes session b from the circular list at a block 412.

On the other hand, if reducing the actual CLF for session b by one does not satisfy the resource capacity constraints as determined at the block 406, the node-wide resource manager 14 at the block 412 removes the session b from the circular list because the actual CLF for session b cannot be further reduced. After session b is removed from the circular list, or if the CLF of session b is reduced by one but the CLF for session b is not yet zero, the node-wide resource manager 14 determines at a block 414 whether all of the sessions on the circular list have been processed in the current round of CLF reduction. If not, b is incremented by one at the block 404 and the functions indicated by the blocks 406, 408, 410, and 412 are re-executed for the next session in the circular list. Thus, QoS expansion is conducted in a round-robin procedure. However, other procedures may be used to expand the QoS's of the sessions on the list. For example, the QoS's of the sessions on the list may be expanded to their corresponding maximums during a single pass through the list.

When all of the sessions in the circular list have been processed in the current round of CLF reduction, the node-wide resource manager 14 determines at a block 416 whether the circular list is empty. If the circular list is not empty, the variable b is reset to zero at a block 418, and the next round of CLF reduction for the sessions remaining on the circular list is initiated. When the circular list is empty, because the CLF of sessions on the circular list have been decreased to zero (i.e., the QoS's of these sessions have been maximized) and/or the CLF of sessions on the circular list cannot be reduced below some minimum amount, QoS expansion is complete.

Upon QoS expansion as indicated at the block 118, the node-wide resource manager 14 waits for another session to arrive or depart.

If a session departs (e.g., a session has been completely executed) as indicated by a block 120, the node-wide resource manager 14 at a block 122 selects the most critical session pending in the criticality-ordered waiting queue 30. The selected session may be in either the WAIT state or the BLOCKED state. This session selected at the block 122 is treated as an arriving session by the node-wide resource manager 14 and the functions indicated by the blocks 102–118 are implemented in order to determine whether the selected most critical session can be executed without preemption, or whether the selected session can be executed with some preemption, or whether the selected session cannot be executed even with preemption.

The QoS resulting from expansion at the block 118 is the QoS for the processing node, and is used by the CPU scheduler 16, the disk I/O scheduler 18, the buffer manager 20, and/or the window/video manager 22 of the processing node in order to schedule and/or manage their corresponding CPU resource 32, disk I/O resource 34, buffer resource 36, and/or window/video processing resource 38.

One of the advantages of the present invention is that the application user may select a different rate and/or QoS range on-line and even a different criticality level. Thus, for example, if an application user's application is preempted, the application user may change the specified timing and/or QoS in an effort to attempt to resume execution of the application.

Figure 11:
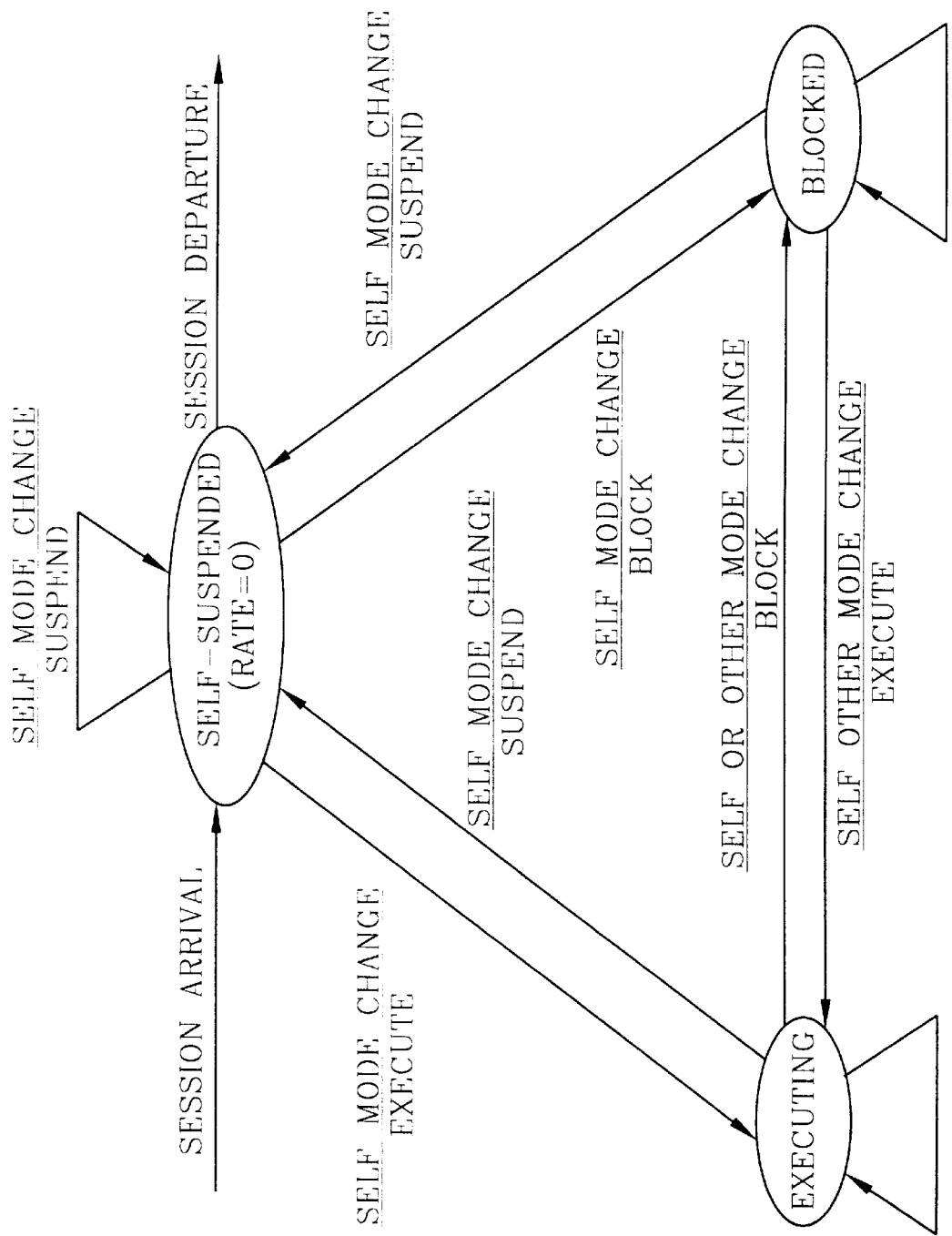
FIG. 11 is a state diagram showing three possible states of a session.

It should be understood from the above description that a session may be in any one of the three states shown in FIG. 11 at a given point in time. As shown in FIG. 11, a session may be in an EXECUTING state, a SELF-SUSPENDED state, or a BLOCKED state. As shown by the Event/Action notation, a session state transition is triggered by an event and takes place by performing one of the actions (operations). Upon arrival of a session, the node-wide resource manager 14 registers the session and puts it in the SELF-SUSPENDED state. When the arriving session requests execution with a set of specific timing (rate and latency) requirements, a QoS range (e.g., [0, CLFmax]), and a criticality value, the node-wide resource manager 14 calculates the actual CLFa$_i$ of the session and generates the session resource requirements according to the equations (4), (5), (7), and (9). If the resources of the processing node are sufficient to meet these resource requirements, the session is put in the EXECUTING state; otherwise, the session is put in the BLOCKED state.

A session in the EXECUTING state can remain in the EXECUTING state or enter either the SELF-SUSPENDED state or the BLOCKED state. For example, if the application user reduces the rate of the session to zero or otherwise determines to suspend execution of the session, the session in the EXECUTING state enters the SELF-SUSPENDED state. A session in the EXECUTING state may be preempted by arrival of an arriving session, in which case the session enters the BLOCKED state. An unsuccessful attempt may be made to preempt a session in the EXECUTING state due to arrival of an arriving session, in which case the session remains in the EXECUTING state.

A session in the BLOCKED state can remain in the BLOCKED state or enter either the SELF-SUSPENDED state or the EXECUTING state. For example, if the application user reduces the rate of the session to zero or otherwise determines to suspend execution of the session, the session in the BLOCKED state enters the SELF-SUSPENDED state. A session in the BLOCKED state may be determined to be admissible because of resource capacity which becomes available due to the preemption of other sessions, due to complete execution of other sessions, and the like, in which case the session enters the EXECUTING state. A session in the BLOCKED state may be determined to be still inadmissible because of insufficient resource capacity, in which case the session remains in the BLOCKED state.

A session in the SELF-SUSPENDED state can remain in the SELF-SUSPENDED state or enter either the BLOCKED state or the EXECUTING state. For example, if the application user continues to maintain the rate of the session at zero or otherwise determines to maintain suspension of the execution of the session, the session in the SELF-SUSPENDED state remains in the SELF-SUSPENDED state. A session in the SELF-SUSPENDED state, who requests execution as discussed above, may be determined to be admissible because sufficient resource capacity becomes available due to the shrinking of the QoS's of other executing sessions, due to the preemption of other sessions, due to complete execution of other sessions, and the like, in which case the session enters the EXECUTING state. A session in the SELF-SUSPENDED state, who requests execution, may be determined to be inadmissible because of insufficient resource capacity, in which case the session enters in the BLOCKED state.

Certain modifications of the present invention have been discussed above. Other modifications will occur to those practicing in the art of the present invention. For example, as described above, the processing node $12_i$ includes the CPU scheduler 16, the disk I/O scheduler 18, the buffer manager 20, and the window/video manager 22 which schedule access to a CPU resource, to a disk I/O resource, to a buffer memory resource, and to a window/video processing resource, respectively. However, the processing node $12_i$ may include apparatus other than, or in addition to, the CPU scheduler 16, the disk I/O scheduler 18, the buffer manager 20, and the window/video manager 22 for scheduling access to resources other than, or in addition to, a CPU resource, a disk I/O resource, a buffer memory resource, and a window/video processing resource.

Also, the tests as described above are conducted in relation to criteria established by the equations (4), (5), (7), and (9). However, these tests may be conducted according to other criteria, not necessarily the criteria established by the equations (4), (5), (7), and (9).

In addition, the present invention has been described in connection with mission-critical continuous multimedia applications. However, the present invention may be useful with other types of applications.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A resource manager for managing a resource, wherein the resource executes executing sessions, wherein the resource receives an arriving session, wherein the executing sessions have corresponding QoS's, wherein the arriving session has a QoS, and wherein the resource manager comprises:

QoS shrinking means for shrinking the QoS's of the executing sessions and the QoS of the arriving session in order to execute the arriving session;

preempting means for preempting, as necessary, the executing sessions; and,

QoS expanding means for expanding the QoS's of the executing sessions.

2. The resource manager of claim 1 wherein the executing sessions have corresponding criticality levels, wherein the arriving session has a criticality level, and wherein the preempting means preempts, as necessary, the executing sessions which have a criticality level that is lower than the criticality level of the arriving session.

3. The resource manager of claim 1 wherein the preempting means includes determining means for determining a schedulable criticality level from among the executing sessions.

4. The resource manager of claim 3 wherein the QoS expanding means expands the QoS of each session to a maximum QoS supportable by the resource.

5. The resource manager of claim 3 wherein the determining means implements a binary search procedure to determine the schedulable criticality level from among the executing sessions.

6. The resource manager of claim 3 wherein the executing sessions have corresponding criticality levels, wherein the arriving session has a criticality level, and wherein the preempting means preempts, as necessary, the executing sessions which have a criticality level that is lower than the criticality level of the arriving session.

7. The resource manager of claim 6 wherein the determining means determines the schedulable criticality level from among the executing sessions which have criticality levels that are lower than the criticality level of the arriving session.

8. The resource manager of claim 1 wherein the QoS shrinking means shrinks QoS's in order of running time with the QoS's of the longest running executing session being shrunk first.

9. The resource manager of claim 1 wherein the QoS shrinking means shrinks the QoS's randomly.

10. The resource manager of claim 1 wherein the QoS shrinking means shrinks QoS's in order of criticality.

11. The resource manager of claim 1 wherein the preempting means implements a linear program to determine which, if any, executing sessions are to be preempted.

12. The resource manager of claim 1 wherein the preempting means implements a linear approximation program to determine which, if any, executing sessions are to be preempted.

13. The resource manager of claim 1 wherein the preempting means preempts executing sessions in order of running time with the longest running session being preempted first.

14. The resource manager of claim 1 wherein the preempting means implements a primal-dual algorithm to determine which, if any, executing sessions are to be preempted.

15. The resource manager of claim 1 wherein the QoS expanding means expands the QoS's of the executing sessions in order of QoS with the QoS of the executing session having the lowest QoS being expanded first.

16. The resource manager of claim 1 wherein the QoS expanding means expands the QoS's of the executing sessions in order of session arrival with the QoS of the executing session arriving first being expanded first.

17. The resource manager of claim 1 wherein the QoS expanding means expands the QoS's of the executing sessions in order of execution time with the QoS of the executing session having the shortest execution time being expanded first.

18. The resource manager of claim 1 wherein the QoS expanding means expands the QoS's of randomly selected executing sessions.

19. The resource manager of claim 1 wherein the QoS expanding means implements QoS expansion of each session in round-robin order.

20. The resource manager of claim 19 wherein the QoS expanding means increases the QoS of each session by a predetermined amount in round-robin order until the QoS of each session reaches a predetermined maximum or a maximum supportable by the resource.

21. The resource manager of claim 1 wherein the QoS shrinking means shrinks QoS's of all executing sessions at once.

22. The resource manager of claim 1 wherein the preempting means preempts executing sessions in random order.

23. A method for managing a resource, wherein the resource executes executing sessions, wherein the resource has a resource capacity constraint, wherein the resource receives an arriving session, wherein each of the executing sessions has a QoS and a criticality level, wherein the arriving session has a QoS and a criticality level, and wherein the method comprises the following steps:
   a) shrinking the QoS's of the executing sessions and of the QoS of the arriving session;
   b1) admitting the arriving session without preemption if the executing sessions and the arriving session do not exceed the resource capacity constraint of the resource;
   b2) if the arriving session, and the executing sessions having criticality levels higher than the criticality level of the arriving session, do not exceed the resource capacity constraint of the resource, but the arriving session and all executing sessions exceed the resource capacity constraint of the resource, preempting, as necessary, the executing sessions which have criticality levels that are lower than the criticality level of the arriving session;
   b3) denying admission of the arriving session if the arriving session, and all of the executing sessions having criticality levels higher than the criticality level of the arriving session, exceed the resource capacity constraint of the resource; and,
   c) expanding the QoS of sessions remaining following steps b1), b2), and b3).

24. The method of claim 23 wherein step b2) comprises the step of determining a schedulable criticality level from among the executing sessions.

25. The method of claim 24 wherein the step of determining a schedulable criticality level from among the executing sessions comprises the steps of:
   b2,1) setting a=1 and b=h, wherein h represents a level of executing sessions which is one criticality level below a criticality level of the arriving session;
   b2,2) if all executing sessions in criticality levels above criticality level (a+b)/2 do not exceed the resource capacity constraint of the resource, setting b=(a+b)/2;
   b2,3) if all executing sessions in criticality levels above criticality level (a+b)/2 do exceed the resource capacity constraint of the resource, setting a=(a+b)/2;
   b2,4) when a<b−1, repeating steps b2,2) and b2,3); and,
   b2,5) when a≧b−1, designating a as the schedulable criticality level.

26. The method of claim 24 wherein the step b2) comprises the step of determining which, if any, executing sessions having criticality levels at and below the schedulable criticality level are to be preempted.

27. The method of claim 23 wherein step a) comprises the step of shrinking QoS's in order of running time, with the QoS's of the longest running executing session being shrunk first.

28. The method of claim 23 wherein step a) comprises the step of shrinking QoS's randomly.

29. The method of claim 23 wherein step a) comprises the step of shrinking QoS's in order of criticality.

30. The method of claim 29 wherein step b2) comprises the step of implementing a linear program to determine which, if any, executing sessions are to be preempted.

31. The method of claim 23 wherein step b2) comprises the step of implementing a linear approximation program to determine which, if any, executing sessions are to be preempted.

32. The method of claim 23 wherein step b2) comprises the step of preempting executing sessions in order of running time, with the longest running session being preempted first.

33. The method of claim 23 wherein step b2) comprises the step of implementing a primal-dual algorithm to determine which, if any, executing sessions are to be preempted.

34. The method of claim 23 wherein the QoS of each of the executing sessions is represented by an actual corresponding consecutive loss factor CLFa, wherein the QoS of the arriving session is represented by an actual corresponding consecutive loss factor CLFa, and wherein step c) comprises the steps of:
   c1) creating a list of all remaining sessions;
   c2) setting b=0;
   c3) incrementing b by 1;
   c4) if reducing the CLFa of session b by one does not cause session b to exceed the resource capacity constraint of the resource, reducing the CLFa of session b by one;
   c5) if the CLFa of session b is zero, removing session b from the list;
   c6) if reducing the CLFa of session b would cause session b to exceed the resource capacity constraint of the resource, removing session b from the list;
   c7) repeating steps c3), c4), c5), and c6) until b is equal to the number of sessions on the list; and,
   c8) repeating steps c2), c3), c4), c5), c6), and c7) until the list is empty.

35. The method of claim 23 wherein step c) comprises the step of expanding the QoS's of the executing sessions in order of QoS, with the QoS of the executing session having the lowest QoS being expanded first.

36. The method of claim 23 wherein step c) comprises the step of expanding the QoS's of the executing sessions in order of session arrival, with the QoS of the executing session arriving first being expanded first.

37. The method of claim 23 wherein step c) comprises the step of expanding the QoS's of the executing sessions in order of execution time, with the QoS of the executing session having the shortest execution time being expanded first.

38. The method of claim 23 wherein step c) comprises the step of expanding the QoS's of randomly selected executing sessions.

39. The method of claim 23 wherein step c) comprises the step of implementing QoS expansion of each session in round-robin order.

40. The method of claim 39 wherein step c) comprises the step of increasing the QoS of each session by a predetermined amount in round-robin order until the QoS of each session reaches a predetermined maximum or a maximum supportable by the resource.

41. The method of claim 23 wherein step a) comprises the step of shrinking QoS's of all executing sessions at once.

42. The resource manager of claim 23 wherein step b2) comprises the step of preempting executing sessions in random order.

43. A system comprising:
   a plurality of resources;
   an operating system, wherein the operating system is arranged to operate the resources;
   a plurality of resource schedulers, wherein each resource scheduler schedules access to a corresponding resource; and,
   a resource manager, wherein the resource manager receives resource capacity constraints from the resource schedulers, wherein the resource manager manages the resources in order to execute sessions within the resource capacity constraints, and wherein the resource manager sits on top of the operating system.

44. The system of claim 43 wherein the resource manager comprises:
   QoS shrinking means for shrinking QoS's of a plurality of executing sessions and a QoS of an arriving session;
   preempting means for preempting, as necessary, the executing sessions which have criticality levels that are lower than a criticality level of the arriving session; and,
   QoS expanding means for expanding the QoS's of sessions.

45. The system of claim 44 wherein the QoS shrinking means shrinks the QoS of the executing sessions and shrinks the QoS of the arriving session.

46. The system of claim 44 wherein the preempting means includes determining means for determining a schedulable criticality level with respect to the executing sessions.

47. The system of claim 46 wherein the QoS expanding means expands the QoS of each session to a maximum QoS supportable by the resources.

48. The system of claim 44 wherein the QoS expanding means expands the QoS of each session to a maximum QoS supportable by the resource.

49. A resource manager for managing of a session according to a criticality level, a timing requirement, and a QoS of the session.

50. The resource manager of claim 49 wherein the resource manager is arranged to shrink the QoS of the session.

51. The resource manager of claim 50 wherein the resource manager is arranged to preempt the session, if necessary.

52. The resource manager of claim 51 wherein the resource manager is arranged to expand the QoS of the session if the session is not preempted.

53. The resource manager of claim 49 wherein the timing requirement comprises rate and latency requirements.

54. A method of initiating on-line QoS negotiation and adaptation by a user comprising the following steps:
   a) specifying a criticality level for a session;
   b) specifying a timing requirement for the session;
   c) specifying a QoS for the session; and,
   d) after partial execution of the session, respecifying at least one of the criticality level, the timing requirement, and the QoS for the session.

55. The method of claim 54 wherein step d) comprises the step of re-specifying the criticality level, the timing requirement, and the QoS for the session.

56. The method of claim 54 wherein the timing requirement comprises rate and latency requirements.

* * * * *